Sept. 9, 1930. H. M. DAWLEY ET AL 1,775,237
STAGE VISION APPARATUS
Filed Nov. 24, 1928
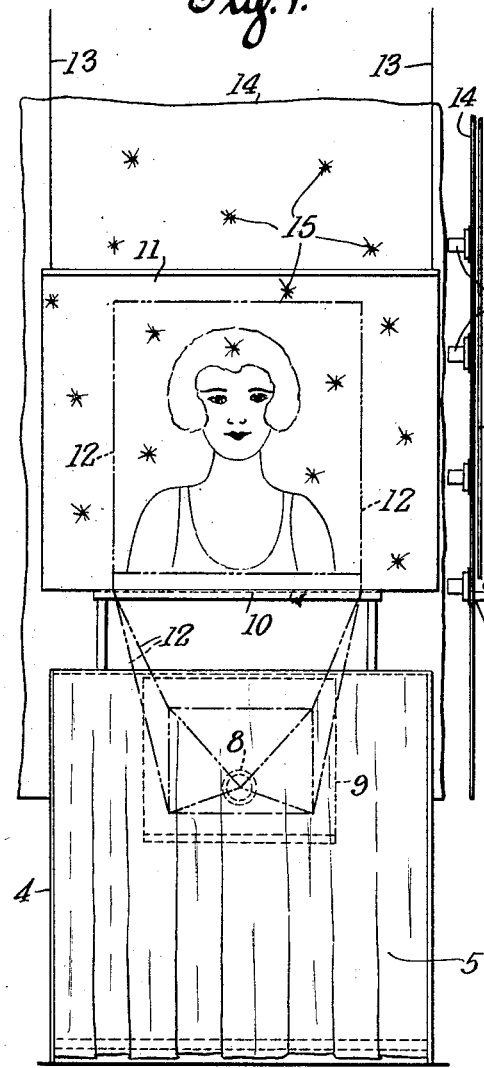
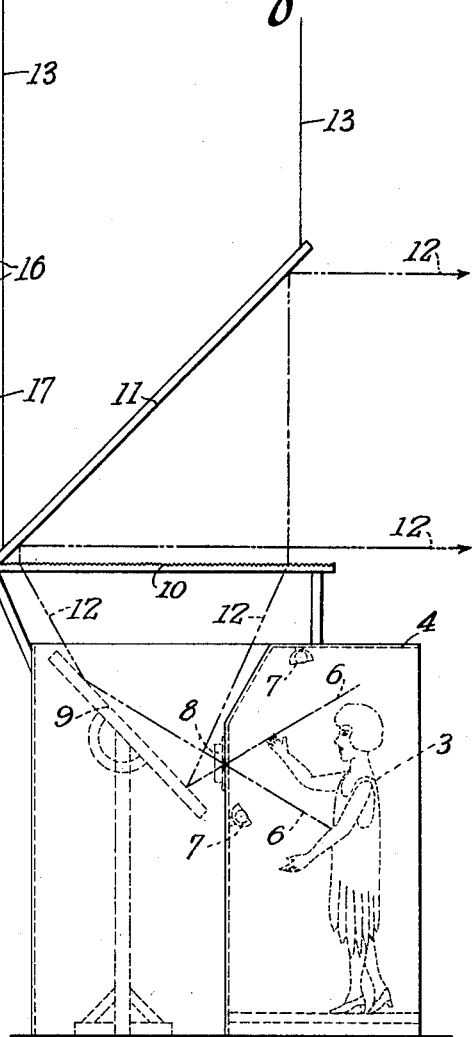

Patented Sept. 9, 1930

1,775,237

UNITED STATES PATENT OFFICE

HERBERT M. DAWLEY, OF CHATHAM, NEW JERSEY, AND FRANK C. REILLY, OF NEW YORK, N. Y.; SAID DAWLEY ASSIGNOR TO SAID REILLY

STAGE VISION APPARATUS

Application filed November 24, 1928. Serial No. 321,571.

This invention relates to the creation of illusions for stage effects and particularly to the creation of phantom images in space.

The objects of the invention are to provide simple practical apparatus for the purpose, which will operate effectively for the desired results.

The foregoing and other desirable objects are attained by certain novel combinations and features of construction and arrangement as hereinafter described and illustrated by way of example in the accompanying drawing.

The drawing referred to and forming part of this specification illustrates one practical embodiment of the invention, but it is to be understood that the structure may be modified as regards this disclosure without departure from the true spirit and broad scope of the invention.

Fig. 1 is a broken front elevation of the apparatus and illustrating the phantom effect produced thereby; Fig. 2 is a broken side view of the apparatus.

The subject or object which is to be projected in phantom form is indicated at 3 within a dark cabinet 4 which, for the sake of easy ingress and egress may be closed at the front by a dark curtain 5.

The subject or so much of the subject as is to be projected, within the lines 6 is brightly illuminated by appropriately placed lights 7, which may, as shown be focused on the subject from above and below.

A lens 8 in the back of the cabinet is focused on a reflecting mirror 9 arranged substantially at a 45° angle as shown. Above this reflector is placed an enlarging screen 10 shown as arranged horizontally. This screen may be of the type known in the trade as a "Translux" screen, that is of a transparent or translucent gelatinous, ribbed or prismatic material as indicated.

Above the screen there is placed a second reflector 11 shown as standing at substantially a 45° angle, leaned forward in the direction of the audience, so as to project the image in the manner indicated by the projection lines 12. This second reflector in practise is usually a large sheet of transparent plate glass supported in space by invisible wires 13 or the like, so as to be invisible as a whole to the audience.

It will be observed that with the construction and arrangement as shown, the subject or object within the field of the lens 8 will be projected by the reflector 9 through the enlarging screen 10 up onto the invisible reflector 11 and hence will be apparent to the audience as a phantom figure in space.

The screen 10 gives a certain depth or perspective to the figure, making the phantom more realistic.

As the final projecting reflector 11 is transparent and invisible, a cyclorama or the like, such as indicated at 14 may be placed in back of this reflector to produce the "star" effects indicated at 15, Fig. 1, through and about the reflector, from the star projectors 16 of the cyclorama. To accentuate the phantom effect, a curtain 17 of scrim or the like, may be hung in between the cyclorama and the back of the screen 11, and slowly moved to vary the effect of the illusion. Other lighting or coloring, or light varying effects may be used with the transparent screen and the vision be caused to appear or disappear or fade out as desired, by varying the extent of illumination about the screen or of the subject. By varying the distance of the screen from the first reflector, the amount of enlargement can be controlled or the illusion may be shown full size or reduced size.

The dark cabinet may be considered as a scanning booth having a projecting window and the lens as a scanning lens, since the latter is focused on the subject within the illuminated field and projects the image of the latter onto the first reflector. The screen serves to size the projected image as well as to give it the desired depth effect.

What is claimed is:

1. Stage illusion apparatus, comprising in combination a dark cabinet for the subject or object to be projected, means for illuminating said subject or object, a reflector, a lens for projecting an image of the illuminated subject or object upon said reflector, a screen in the projecting range of said reflector and an invisible reflector arranged at a projecting angle at the opposite side of said screen from said first reflector.

2. Stage illusion apparatus, comprising in combination a dark cabinet for the subject or object to be projected, means for illuminating said subject or object, a reflector, a lens for projecting an image of the illuminated subject or object upon said reflector, a screen in the projecting range of said reflector, an invisible reflector arranged at a projecting angle at the opposite side of said screen from said first reflector, said screen being arranged at a distance from the first reflector to effect an enlargement of the reflected image.

3. Stage illusion apparatus, comprising in combination a dark cabinet for the subject or object to be projected, means for illuminating said subject or object, a reflector, a lens for projecting an image of the illuminated subject or object upon said reflector, a screen in the projecting range of said reflector, an invisible reflector arranged at a projecting angle at the opposite side of said screen from said first reflector and light effect means in back of said invisible screen.

4. Stage illusion apparatus, comprising in combination with a reflector and an object scanning lens focused thereon, a transparent reflector arranged at a projecting angle to the first reflector and an image screen in the field of projection between said first and second projectors.

5. Stage illusion apparatus, comprising in combination with a reflector and an object scanning lens focused thereon, a transparent reflector arranged at a projecting angle to the first reflector, an image screen in the field of projection between said first and second projectors and means for illuminating an object in the scanning range of said lens.

6. Stage illusion apparatus, comprising a reflector, an object scanning lens focused on said reflector, a transparent reflector arranged at a projecting angle relative to the first reflector and an image sizing screen interposed in the field of reflection between the two reflectors.

7. In apparatus of the character disclosed, an image reflecting mirror, a transparent reflector arranged at a projecting angle thereto and an image sizing screen arranged in the field of reflection between said first and second reflectors.

8. Phantom projecting apparatus, comprising a scanning booth having a projecting window, a reflector arranged at a projecting angle to said window, a transparent reflector arranged at a projecting angle relative to said first reflector and a depth effect screen interposed in the field of reflection between said first and second reflectors.

9. Phantom projecting apparatus, comprising a scanning booth having a projecting window, a reflector arranged at a projecting angle to said window, a transparent reflector arranged at a projecting angle relative to said first reflector and an image size changing screen interposed between said first and second reflectors.

In testimony whereof we affix our signatures.

HERBERT M. DAWLEY.
FRANK C. REILLY.